June 22, 1971    F. M. GALLOWAY ET AL    3,586,558
CONTINUOUS MANUFACTURE OF REINFORCED HOSE
Filed Nov. 28, 1967
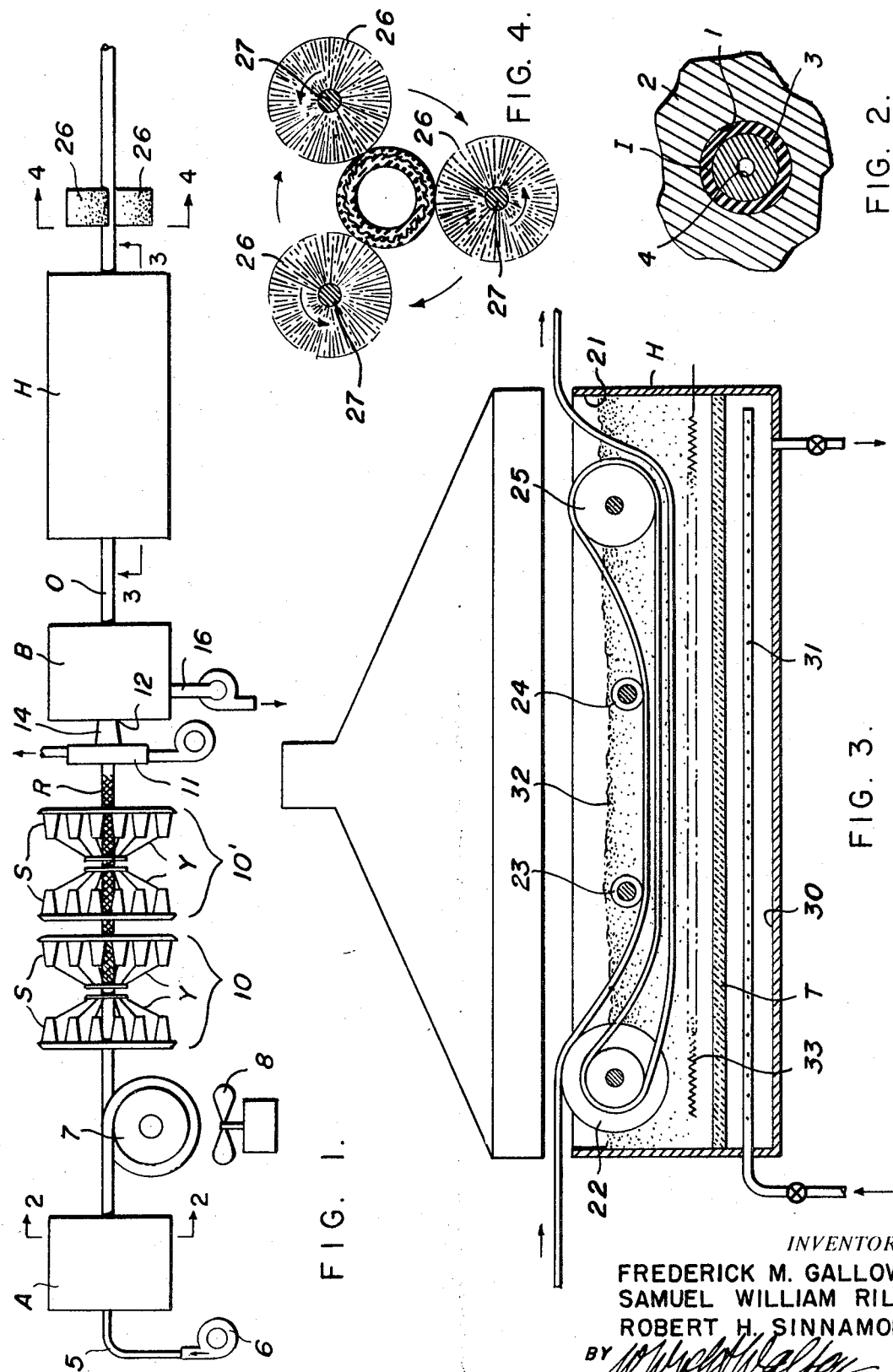
INVENTORS
FREDERICK M. GALLOWAY
SAMUEL WILLIAM RILEY
ROBERT H. SINNAMON
BY
ATTORNEY.

United States Patent Office 3,586,558
Patented June 22, 1971

3,586,558
CONTINUOUS MANUFACTURE OF REINFORCED HOSE
Frederick M. Galloway, Coraopolis, Pa., Samuel William Riley, Trenton, N.J., and Robert H. Sinnamon, Huntingdon Valley, Pa., assignors to H. K. Porter Company, Inc., Pittsburgh, Pa.
Filed Nov. 28, 1967, Ser. No. 686,037
Int. Cl. B29b 17/02
U.S. Cl. 156—149    5 Claims

ABSTRACT OF THE DISCLOSURE

This invention provides a method of and apparatus for continuously manufacturing elastomeric hose having reinforcement in the form of knitted, woven, braided or lapped textile yarns or the like between extruded elastomeric inner and outer layers the elastomeric components of which are cured in a continuous vulcanizer as the hose passes through it, fluid pressure being maintained in the hose to preserve its cylindrical form as rapidly moving, chemically inert, hot solid particles impart curing heat to it.

BACKGROUND OF THE INVENTION

(1) Field of the invention

In the manufacture of elastomeric hose of relatively small diameter such as that used for conducting hot liquid to and from automotive vehicle heaters, for carrying gaseous fluids of various kinds to points of consumption and the like it has been customary to utilize one of numerous "batch" procedures in which hose lengths are made by extrusion processes, usually with application of a reinforcing layer intervening between extrusion of the inner elastomeric layer and an outer elastomeric cover, pieces of finite length often being encased in an extruded lead jacket during vulcanization of the elastomeric components, which jacket is stripped from the hose after curing.

(2) Description of the prior art

Efforts to make hose of the character mentioned by a continuous process have enabled extruders, machines for applying reinforcement and vulcanizers to operate substantially continuously as in U.S. Letters Patent 2,974,713, granted Mar. 14, 1961, to the assignee of this application, but that process requires a flexible mandrel which must be cut into individual lengths, with the hose formed about it, to enable it to be extracted after which the lengths are joined together for re-use.

SUMMARY OF THE INVENTION

In the manufacture of reinforced flexible hose and tubing in accordance with the present invention there is extruded from an annular orifice an inner tubular layer of elastomeric material into which fluid under pressure is introduced through the core of the extrusion head thus preserving the cylindrical contour of the tubular layer during subsequent operations.

After formation this layer is cooled to some extent and then continuously fed to apparatus for applying an outer reinforcing layer thereto which apparatus may be a circular knitting machine, a braider or a lapping machine adapted to apply one or a plurality of layers of yarn or the like progressively about the inner elastomeric layer as it passes therethrough.

Thence after momentary localized "flash" heating to vaporize moisture or other volatile components of the reinforcement and expand ambient air entrapped by it, and while still subjected to pressure of its contained fluid the reinforced tube is progressively introduced to a second continuous extruder in which it serves as a moving core while passing through a circular opening defining therewith a second annular extrusion port as an outer layer of elastomeric material is laid on over the reinforcement to form a covering, vacuum means associated with the extruder removing air and other volatile matter from between the elastomeric layers to insure a good bond by contact of the elastomeric layers through interstices in the reinforcement.

From the second extruder the reinforced and covered tube moves to a continuous vulcanizer in which it is subjected to the action of a stream of a hot gaseous medium carrying a multitude of hot particles of a chemically inert material, such as minute glass beads of 0.1–0.2 mm. diameter which, suspended in the gaseous fluid stream, impart to it some of the characteristics of a liquid bath.

The hose is subjected to this so-called fluidized bed for a time sufficient to cure its elastomeric components, preferably being festooned therethrough a plurality of times to avoid making the bed of impractical length and as the hose leaves the fluidized bed its external surface is brushed by a plurality of planetary rotating cylindrical brushes for mechanically removing adhering particles.

The finished hose in a continuous length may then be cut into pieces of any desired lineal dimension within practical limits although it may be desirable to leave a considerable length of it uncut to assist in retention of adequate internal pressure at the formative stages.

BRIEF DESCRIPTION OF THE DRAWING

FIG. 1 is a diagrammatic side elevation of preferred apparatus embodying the invention and adapted for the practice of the method thereof;
FIG. 2 is an enlarged section on line 2—2 in FIG. 1;
FIG. 3 is an enlarged section on line 3—3 in FIG. 1; and
FIG. 4 is an enlarged section on line 4—4 in FIG. 1.

DESCRIPTION OF THE PREFERRED EMBODIMENT

As each of the several units of the apparatus we have developed for continuous manufacture of flexible reinforced hose is available in substantially the form in which we employ them it will be unnecessary herein to describe the mechanical details of any except perhaps to the extent certain of them are modified structurally and perform in a manner somewhat different from that for which they respectively were originally designed and intended.

Thus, in a first extruder A, it is unnecessary to describe in detail the mechanism by which elastomeric material under pressure is induced to issue at elevated temperature from annular extrusion port 1 defined by a cylindrical passage in head 2 and a coaxial core 3, but it is to be noted the latter also provides a fluid discharge port 4 connected through a pipe 5 to a source 6 of fluid under pressure, air being preferred.

The pressure of this fluid within the inner tube I as it is formed at extrusion port 1 is preferably maintained at a value sufficient to prevent collapse of the tube during subsequent operations, but without risking incidence of undue dilation through excess pressure.

If desired, a small proportion of moisture or water vapor may be introduced with the air flowing through port 4, as an adjunct to the mere expansion of air on heating to assist in controlling internal pressure in the tube I as will hereinafter more fully appear. The working of the elastomeric material in the extruder usually produces heat sufficient to insure uniform extrusion of the tube at an elevated temperature at which the material is virtually semifluid and thus substantially lacking in tensile strength or toughness. It is accordingly carried from extruder A to a metal cooling drum 7 about which it is wound in a number of convolutions, conveniently about ten, over which ambient air is circulated by a fan 8 or the like whereby a considerable proportion of the excess heat in the tube is dissipated and its strength thereby appreciably increased. It is then passed progressively through a reinforcing machine which may as noted be a knitter, braider, lapper or any other convenient machine, in the present illustration a lapper 10, adapted for continuously applying reinforcement R to the exterior of the tube.

Two of these machines are indicated in the drawing, respectively designated 10, 10' each comprising a plurality of spools S on which are wound yarns Y or the like of which the reinforcement is formed; these are preferably provided to enable continuous hose production to be carried out on the apparatus as a whole. Reinforcement applying machines 10, 10' are thus desirably of such character that as spools S on one of them, for example machine 10, approach exhaustion of their supplies of yarn, the other, machine 10' carrying full spools, may be started up and thereafter supply the reinforcing layer while the first is being shut down and its spools are being replenished with reinforcing material or replaced with full spools to resume operation upon exhaustion of the spools carried by machine 10'. These machines thus operate alternately, rather than concurrently, in the manner indicated, although it is not without the purview of the invention that but one of them be employed in which case the production line may have to be shut down temporarily when the reinforcing material in the machine becomes exhausted. It may also be preferred in some situations to operate the first extruder, cooling drum 7 and reinforcement applying mechanism at a rate of speed of linear production higher than the remainder of the apparatus hereinafter more fully described and to interpose in the production line "downstream" from the reinforcement applying mechanism an accumulator or the like (not shown but of which there are several types readily available on the market). When this expedient is employed a considerable quantity of the reinforced inner tube may be accumulated in the accumulator to maintain a constant rate of feed to subsequent units while permitting interruption of the operation of the first extruder, the reinforcement applying unit and associated mechanisms for adjustment, repair or replenishment of reinforcing material.

Moreover when knitted, woven, braided or other reinforcement not susceptible of being produced so rapidly as lapped reinforcement is employed it may be essential in order to maintain a semblance of continuous operation to employ such accumulator at the point indicated and to start up the leading part of the production line, including the first extruder, the cooling drum and the reinforcement applying unit well in advance of starting the remaining units. The accumulator may then be filled with reinforced inner tube before the faster later units are started, and after the accumulator stock has been depleted later units can be shut down for a time until the accumulator stock has been replenished.

From the reinforcement applying unit, or from the accumulator if one be employed, the reinforced tube passes progressively through a flash heater 11 where it is momentarily subjected to a stream or blast of highly heated air directed against it at a temperature adequate almost instantaneously to vaporize any excess moisture or other volatile matter and to expand entrapped air carried by the reinforcement or in its interstices. An air temperature of 400°–1000° F. depending to some extent on the speed of passage is here preferred as it is not desired at this point to bring the elastomeric inner tube to curing heat, nor to affect adversely the physical properties of the reinforcement, but merely to facilitate removal of foreign matter from outer surfaces of the reinforced tube prior to application thereto of a covering layer of elastomeric material whereby bonding of the elastomeric layers through interstices in the reinforcement is promoted.

The reinforced tube passes progressively and directly from heater 11 to a second extruder B carrying at its inlet port 12 a yieldable conical plug 14 presenting an axial bore for passage of the reinforced tube and forming a substantially airtight seal with port 12 whereby through pipe 16 connected with the extruder inwardly from port 12 between it and the circular extrusion port of the extruder a vacuum preferably of the order of 15''–20'' of mercury is maintained. In consequence the heated air, volatilized moisture and other volatile matter carried into extruder B by the tube or its reinforcement are removed to avoid entrapment between the inner tube and the cover applied at the extrusion port of this extruder. The reinforcement R about the unvulcanized inner tube enables it to resist dilation due to the pressure differential within and externally of it as it passes through extruder B prior to receiving its outer covering while the tendency of the internal pressure to force the inner tube outwardly through interstices in the reinforcement, combined with surrounding vacuum and the inward pressure of the cover as it is extruded over the reinforcement promotes intimate contact between the two elastomeric layers which thus become intimately bonded together through the said interstices.

Extruder B is substantially like continuous extruders well known in the art and requires no further or more particular description. It is effective to apply to the exterior of the reinforced tube I an outer covering O of elastomeric material which as just explained becomes bonded through interstices in the reinforcement to the outer surface of inner tube I and the fully formed but not yet cured hose then issues progressively from this extruder at an elevated temperature still confining fluid under pressure in its interior and is fed progressively therefrom to an elongated housing H. This housing defines a chamber 21 through which the hose passes longitudinally, first over an idler sheave 22, then under a pair of idlers 23, 24 and thence out of the housing or, as is usually preferred, depending on the time required for curing the elastomeric components, may be threaded about, over and under additional suitably placed idlers such as idler 25 and others (not shown) so as to retain any point in its length within the housing for three, five or any other odd number of traverses of the chamber if it is to be withdrawn from the end opposite that it enters, or an even number if it is withdrawn from the same end.

In either case, however, adjacent the exit port of the housing is positioned a brushing mechanism comprising a plurality of positively driven planetary rotating brushes 26 rotating on spindles 27 revolving in turn about the axis of the hose whereby any particles adhering to the outer surface of the latter are mechanically removed.

Housing H preferably is enclosed and desirably provided with suitable ventilating means (not shown) for carrying off noxious fumes which sometimes emanate from curing elastomeric materials and has at its bottom porous tiles T under which is a chamber 30 containing a perforated distribution pipe 31 connected with a source (not shown) of gaseous fluid under pressure whereby said fluid passing through tiles T composes a fluidized bed 32 of hot solid particles, in which is preferably immersed one or a number of electric heating units 33 although other heating means may be used if desired. Thus as the hose passes longitudinally through the housing immersed in the bed of hot particles maintained in a state of contant agitation by the flow of air, superheated steam or the like through tiles T and at elevated temperature by conduction and radiation from heating unit 33 or equivalent, the intimate contact of the vast number of minute heated particles rapidly brings the hose to vulcanizing temperature whereby its elastomeric components become cured.

Additionally, as the hose is heated the fluid in its interior, as noted usually air, becomes heated in turn and expands, thus in effect operating as a moving plug or restriction in the tube enabling the relatively cold fluid at its initial point of entry into the tube through port 4 to be maintained at an adequate pressure level to prevent collapse even though no solid obstruction be employed in the hose bore. As the air or other fluid which escapes from the free end of the hose is sometimes contaminated by noxious gases emanating from the elastomeric material during the curing operation it is usually advisable to lead such end to a point at which such contaminated fluid can safely be discharged, although such contaminants are seldom if ever sufficiently toxic in the concentrations present to risk danger to operatives required to be present to cut the hose at appropriate points for separating individual lengths of it to meet the demands of industry.

The finished hose produced in accordance with the invention has smooth inner and outer surfaces carrying the high gloss of extruded hose unattainable when hose is cured in a batch process or on an internal flexible mandrel while especially when the air introduced through port 4 is carefully filtered before introduction and any moisture introduced with such air is also maintained pure and sterile the interior of the finished hose is substantially surgically clean and dry, the curing heat effectively vaporizing internal moisture which is thus carried out of the hose with the discharging air. Hence no special cleansing operations after production, as for example to insure dryness of the interior, are required, although necessary when water under pressure is introduced to the hose preceding or during curing, this being standard procedure when hose is cured in a batch process while confined in a lead jacket.

While we have herein described particularly the production of hose designated in the trade single-ply and thus comprising an inner elastomeric tube, a single fibrous or equivalent reinforcing layer and an elastomeric outer covering, and have disclosed in more or less punctilious detail many features and aspects of its production it is specifically to be understood the invention contemplates the production of multiple ply hose as well and those skilled in the art will readily comprehend from the foregoing the extent to which by mere duplication of certain of the units to which we have referred two-ply hose comprising an elastomeric inner tube, a reinforcing layer overlying it, an elastomeric intermediate layer, a second reinforcing layer and an outer elastomeric covering layer, or hose of any other selected number of plies can be produced and this modification as well as others in the mechanisms employed and in the steps of our method which will occur to those skilled in the art may be availed of if desired without departing from the spirit and scope of the invention as defined in the appended claims.

What is claimed is:
1. The method of producing elastomeric reinforced hose which comprises the steps of continuously extruding through an annular extrusion orifice an inner elastomeric tube, progressively cooling said tube, progressively applying to the outer surface thereof a reinforcement of interlaced filamentary material, progressively subjecting the reinforced tube to external vacuum while applying to its outer surface an elastomeric covering layer by extrusion bonding said layer to the inner tube through interstices in the reinforcement, passing the covered tube progressively and repeatedly in opposite directions through a mass of heated particles of inert inorganic material while agitating said particles by passing a plurality of streams of heated gaseous fluid therethrough until the elastomeric components of the hose have been vulcanized, mechanically removing adherent particles of said material from said covering layer and then separating the hose into pieces of finite length.

2. A method as defined in claim 1 in which gaseous fluid under pressure is introduced to said inner tube at said annular extrusion orifice and maintained therein until the hose is separated into finite lengths.

3. A method as defined in claim 1 in which said reinforcement is applied to the inner tube by a continuous knitting operation.

4. A method as defined in claim 1 in which said reinforcement is applied to the inner tube by a continuous braiding operation.

5. A method as defined in claim 1 in which said reinforcement is applied to the inner tube by a continuous lapping operation.

References Cited
UNITED STATES PATENTS

| | | | |
|---|---|---|---|
| 2,888,954 | 6/1959 | Gates | 156—244X |
| 2,974,713 | 3/1961 | Hydrick | 156—244 |
| 3,242,528 | 3/1966 | Elder | 18—6 |
| 3,310,447 | 3/1967 | Matthews | 156—244 |
| 3,336,176 | 8/1967 | Medney | 156—244X |

FOREIGN PATENTS

| | | | |
|---|---|---|---|
| 227,076 | 9/1962 | Austria | 156—244 |
| 1,012,562 | 12/1965 | Great Britain | 264—Fluidized Dig. |

BENJAMIN R. PADGETT, Primary Examiner

G. G. SOLYST, Assistant Examiner

U.S. Cl. X.R.
156—244, 285